United States Patent [19]

Frank et al.

[11] Patent Number: 5,058,557
[45] Date of Patent: Oct. 22, 1991

[54] APPARATUS FOR DELIVERY OF FUEL FROM A STORAGE TANK TO AN INTERNAL COMBUSTION ENGINE OF A VEHICLE

[75] Inventors: Kurt Frank, Schorndorf-Haubersbronn; Hermann Nusser, Markgroeningen; Willi Strohl, Beilstein, all of Fed. Rep. of Germany

[73] Assignee: Robert Bosch GmbH, Stuttgart, Fed. Rep. of Germany

[21] Appl. No.: 606,057

[22] Filed: Oct. 29, 1990

[30] Foreign Application Priority Data

Dec. 13, 1989 [DE] Fed. Rep. of Germany ....... 3941147

[51] Int. Cl.⁵ .......................................... F02M 39/00
[52] U.S. Cl. .................... 123/509; 123/497; 417/368; 417/423.3; 137/565; 137/576
[58] Field of Search ............ 123/509, 514, 497; 417/360, 368, 423.3, 423.5, 423.14, 424.1, 247; 137/565, 576

[56] References Cited

U.S. PATENT DOCUMENTS

| | | | |
|---|---|---|---|
| 3,873,243 | 3/1975 | Nusser et al. | 417/368 |
| 3,897,178 | 7/1975 | Palloch | 417/368 |
| 3,910,464 | 10/1975 | Schlanzky | 137/565 |
| 3,936,240 | 2/1976 | Dochterman | 417/368 |
| 4,295,797 | 10/1981 | Ruhl et al. | 417/368 |
| 4,362,476 | 12/1982 | Kemmner et al. | 417/360 |
| 4,538,968 | 9/1985 | Kusakawa | 417/368 |
| 4,629,399 | 12/1986 | Friebe | 417/247 |
| 4,672,937 | 6/1987 | Fales et al. | 123/509 |
| 4,718,827 | 1/1988 | Sutton et al. | 417/360 |
| 4,822,258 | 4/1989 | Matsuda et al. | 417/423.3 |
| 4,865,522 | 9/1989 | Radermacher | 417/368 |
| 4,869,225 | 9/1989 | Nagata et al. | 123/509 |
| 4,893,647 | 1/1990 | Tuckey | 123/514 |
| 4,928,657 | 5/1990 | Asselin | 123/514 |
| 4,971,017 | 11/1990 | Beaket et al. | 123/509 |

Primary Examiner—Carl Stuart Miller
Assistant Examiner—Tom Moulis
Attorney, Agent, or Firm—Michael J. Striker

[57] ABSTRACT

An apparatus for delivery of fuel from a storage tank to an internal combustion engine of a motor vehicle includes a pot-shaped container secured in the storage tank and a pump for delivery fluid from the storage tank into the container. An electric motor drives the pump. A second pump driven by the same electric motor delivers fluid from the container to the internal combustion engine. The second pump is located with the electric motor in a common housing. A pumping chamber is formed at an outer side of the bottom of the container, and the first mentioned pump has a delivery member located in the pumping chamber and driven by this electric motor.

17 Claims, 1 Drawing Sheet

APPARATUS FOR DELIVERY OF FUEL FROM A STORAGE TANK TO AN INTERNAL COMBUSTION ENGINE OF A VEHICLE

BACKGROUND OF THE INVENTION

The invention relates to an apparatus for delivery of fuel from a storage tank to an internal combustion engine of a vehicle that comprises a container located in the storage tank and in which a pump aggregate including an electric drive motor and a pump, is located. Another pump driven by the same motor, pumps fuel from the storage tank into the container.

An apparatus with two pumps driven by the same motor is disclosed in German patent 3,532,349. In this apparatus, both pumps are located in the drive motor housing. This housing should be rather long in comparison with its diameter, and assembly of the electric motor and the both pumps presents substantial difficulties. Further, a necessary sealing of two pumps from each other requires use of a large intermediate flange.

SUMMARY OF THE INVENTION

The object of the invention is a fuel delivery apparatus of the above-mentioned type but with a reduced length of the motor housing and without an intermediate flange between the pumps. The object of the invention is achieved by providing at the bottom of the container a pumping chamber in which a delivery member driven by the drive motor of the pumping aggregate located in the container, is located.

The present invention both as to its construction so to its method of operation, together with additional objects and advantages thereof, will be best understood from the following detailed description of specific embodiments when read in connection with the accompanying drawings.

DETAILED DESCRIPTION OF THE PREFERRED EMBODIMENTS

Figure 1:
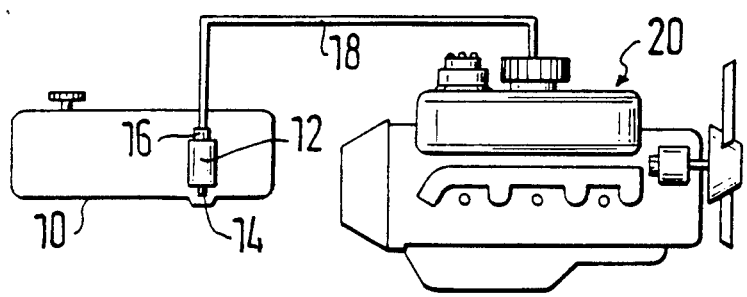
FIG. 1 shows a principle arrangement of a fuel delivery apparatus for motor vehicles.
Figure 2:
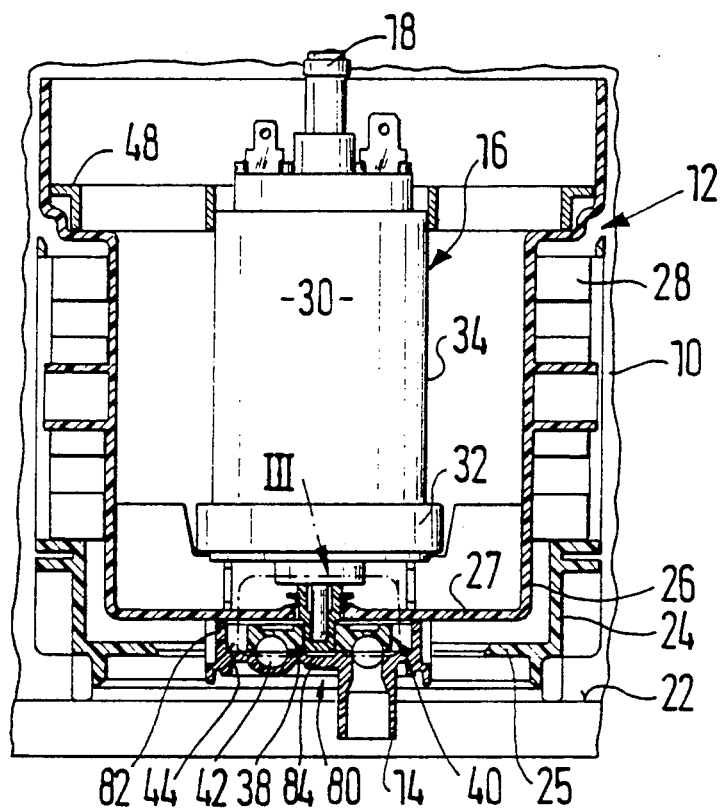
FIG. 2 shows an elevational cross-sectional view of a container for an electric drive motor of a delivery pump and which is located in a fuel storage tank.

FIG. 1 shows a fuel storage tank 10 in which a fuel delivery aggregate 12 is located. A pressure conduit 18 leading to an internal combustion engine 20, is connected to a pressure nipple of a pump aggregate 16 that forms a part of the aggregate 12. During operation of the internal combustion engine, the aggregate 12 provides for delivery of fuel from the storage tank 10 to the internal combustion engine 20. A pot-shaped container 26 is secured in a retaining casing 24 which is supported on the bottom 22 of the storage tank 10 and also forms a part of the fuel delivery aggregate 12. The container 26 is so arranged in the retaining casing 24 that the bottom 27 of the container 26 is located adjacent to the bottom 25 of the casing 24 but is somewhat spaced therefrom. The container 26 is connected with the retaining casing 24 with resilient mounting elements 28. The pump aggregate 16 is located inside the container 26. The pump aggregate 16 has a substantially cylindrical shape and comprises an electrical drive motor 30 and pump 32 both located inside a common housing 34. An extension 36 of a shaft driven by the electric drive motor 30, projects from the housing 34 and extends through the bottom 27 of the container 26. The extension 36 serves as a drive shaft for a delivery member or impeller 38 of a side-channel pump 40. The impeller 38 of the side-channel pump 40 revolves in a pump chamber 44 formed by a cup-shaped element 80. The cup-shaped element 80 is secured to the outer side of the bottom 27 of the container 26. The cup-shaped element 80 has a circular wall 82 that defines the chamber 44. The bottom 84 of the cup-shaped element 80 and the bottom 27 of the container 26 limit the chamber 44 in the direction of the rotational axis of the impeller 38 of the pump 40.

The side-channel pump 40 has a side channel 42 defined by the bottom 84 of the cup-shaped element 80 and a respective surface of the impeller 38 of the side-channel pump 40. A centering ring 48 located at an end of the pump aggregate 16, which is remote from the extension 36, provides for supporting the aggregate 16 in the container 26 in the predetermined position. During operation of the pump aggregate 16, the side-channel pump 40 which can be designated as a first pump, sucks, through a suction nipple 14 that is secured in the bottom 84 of the cup-shaped element 80 and extends into the storage tank 10, fuel from the storage tank 10, and delivers the fuel under pressure through a delivery channel in the container 26 which will be described later. Therefrom, the fuel will be sucked by a second pump 32 located in the housing 34, and delivered through a pressure conduit 18 to the internal combustion engine 20.

Figure 3:
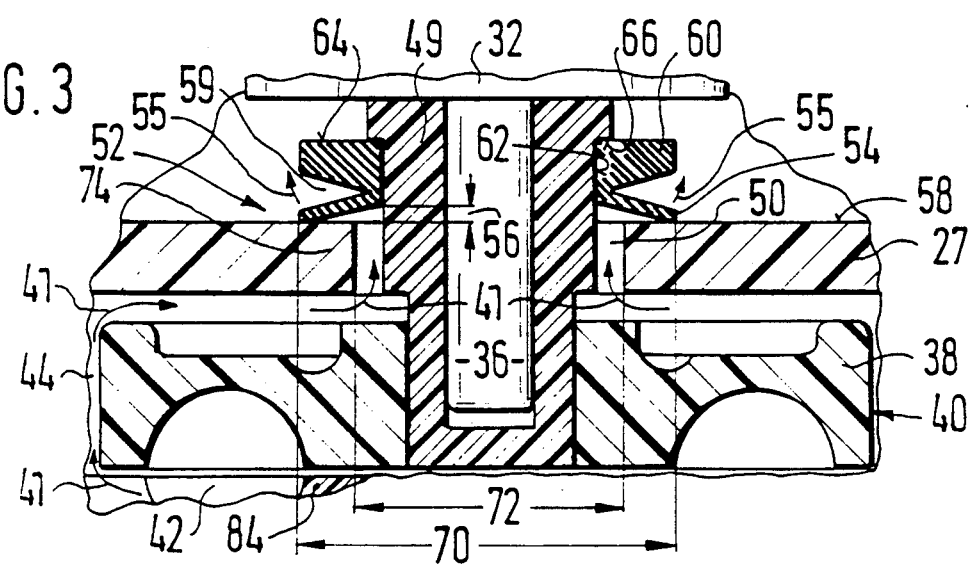
FIG. 3 shows an enlarged cross-sectional view of a unit designated as III in FIG. 2.

As shown in FIG. 3, a sleeve 49 is secured on the extension 36 of the drive shaft. The sleeve 49 forms an integral part of the extension 36. The sleeve 49 extends through an opening in the bottom 27 of the container 26. The diameter of this opening is bigger than the diameter of the sleeve 49 in the region of the sleeve 49 that extends through this opening. The annular space between the surface that defines the opening and the sleeve 49 defines the delivery channel 50 that communicates the pump chamber 44 with the inner space of the container 26. Because the container 26 should be filled with fuel during parking time, the annular delivery channel 50 is equipped with a check valve that should reliably seal the container 26 against idle flow through the channel 50 and the first pump 40. This check valve is designated with numeral 52 in FIG. 3. The check valve 52 has a ring 54 formed of a resilient material and the inner diameter of which firmly engages the outer surface of the sleeve 49. The ring 54 which is formed as a control member of the check valve 52, engages sleeve 49 at a location that is spaced by a distance 56 from the inner surface 58 of the bottom 27 of the container 26. The ring 54 engages, at its outer circumference, the inner surface 58 of the bottom 27 of the container 26 with a small pre-stress.

A retaining ring 60 is formed integrally with the ring 54 in the area of the ring 54 that is adjacent to sleeve 49. The cross-section of the retaining ring 60 is at least two times bigger than that of the ring 54. The both rings 54 and 60 have, thus, a common bore 62 the wall of which engages the outer surface of the sleeve 49. The size of the rings 54 and 60 is so selected that they engage the sleeve with an interference fit so that a pre-stress is provided. The end surface 64 of the ring 60 abuts an annular shoulder 66 of the sleeve 49. The outer diameter 70 of the ring 54 is bigger than the outer diameter 72 of the delivery channel 50 so that the outer circumferential region of the ring 54 forms a sealing ring that sealingly engages the inner surface 58 of the bottom 27 of the container 26 and overlies an annular region 74 of the inner surface 58. Thereby the static pressure of the fuel in the container 26 provides for additional bias of the ring 54 into engagement with the inner surface 58 of the bottom 27 of the container 26.

During operation of the delivery apparatus and also during operation of the drive motor 30 that drives both pumps 32 and 40, the ring 54 is lifted out of engagement with the bottom 27 of the container 26 by centrifugal forces in the direction of arrow 56 and lies in a plane that extends substantially transverse to the rotational axis of the drive shaft. This lift is insured by a space 59 provided between the retaining ring 60 and control member (ring) 54 that expands from a region of both rings 54 and 60 which is located adjacent to the opening defining the delivery channel 50, to the outer regions of both rings 54 and 60. The lifting of the ring 54 frees the channel 50 so that the side-channel pump 40 pumps fluid from the pump chamber 44 through the channel 50 into the container 26. Therefrom the second pump 32 delivers fluid through the pressure conduit 18 to the engine 20. When the drive motor 30 is inoperative, both pumps 32 and 40 remain inoperative, and ring 54 returns to its initial position shown in FIG. 3 and in which it serves as a control member of the check valve 52. The fuel cannot any more flow from the reservoir through the nipple 14, pump 40 and the delivery channel 50 into the container 26. Thereby it is insured that the engine 20 is supplied with fuel even after a long period of parking. A sufficient quantity of fuel is always present in the container 26 which insures feeding of the engine 20 with fuel when little fuel remains in the storage tank 10, and the vehicle moves along a curved path when the suction nipple 14 is outside the volume occupied by fuel.

While the invention has been illustrated and described as embodied in a fuel delivery apparatus for delivery of fuel from a tank to an engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for delivery of fuel from a storage tank to an internal combustion engine of a motor vehicle, said apparatus comprising a pot-shaped container secured in the storage tank and having a bottom; a first pump for delivering fluid from the storage tank into said container; an electric motor for driving said first pump; a second pump driven by said electric motor for delivering fluid from said container to the internal combustion engine and located with said electric motor in a common housing; and a pumping chamber formed at an outer side of said bottom of said container, said first pump having a delivery member located in said pumping chamber and driven by said electric motor.

2. An apparatus as set forth in claim 1, wherein said first pump comprises a side-channel pump, said apparatus further comprising a cup-shaped element secured at the outer side of said bottom of said container and defining said pumping chamber, said cup-shaped element having a bottom spaced from said bottom of said container and limiting therewith said pumping chamber in a direction in which a rotational axis of said delivery member extends.

3. An apparatus as set forth in claim 2, wherein said side-channel pump has a side channel defined by at least one of said bottom of said cup-shaped element and said bottom of said container.

4. An apparatus as set forth in claim 3, wherein said side channel is defined by said bottom of said cup-shaped element.

5. An apparatus as set forth in claim 2, wherein at least one of said bottom of said cup-shaped member and said bottom of said container has a circular wall that limits radially said pumping chamber.

6. An apparatus as set forth in claim 2, wherein said bottom of said cup-shaped member has a circular wall that limits radially said pumping chamber.

7. An apparatus as set forth in claim 2, wherein said bottom of said cup-shaped element has a suction opening connected with the storage tank.

8. An apparatus as set forth in claim 1, wherein said electric motor has a shaft having an extension projecting through said bottom of said container and connected with said delivery element of said first pump for joint rotation therewith.

9. An apparatus as set forth in claim 8, wherein said bottom of said container has an opening through which said extension projects, and a diameter that is bigger than a diameter of said extension whereby a delivery channel is formed, said apparatus further comprising a check valve for preventing backflow of fuel out of said container, said check valve being open during operation of said electric motor.

10. An apparatus as set forth in claim 9, wherein said check valve comprises a control member connected with said extension of said electric motor shaft for joint rotation therewith and actuatable by a centrifugal force caused by its joint rotation with said electric motor shaft.

11. An apparatus as set forth in claim 10, wherein said control member comprises a resilient ring having a wall surface defining an orifice through which said extension of said electric motor shaft extends, which is spaced from an inner surface of said bottom of said container, and which firmly engages said extension, said resilient ring having an outer diameter that is bigger than an outer diameter of said delivery channel, and said resilient ring engaging an area of said bottom of said container surrounding said delivery channel with a prestress when the electric motor is inoperative.

12. An apparatus as set forth in claim 11, further comprising a retaining ring arranged at a side of said resilient ring remote from said bottom area surrounding said delivery channel.

13. An apparatus as set forth in claim 12, wherein said retaining ring is formed integrally with said resilient ring and has a cross-section which is at least twice as big as a cross-section of said resilient ring.

14. An apparatus as set forth in claim 13, wherein said resilient and retaining rings define an annular gap therebetween that expands from edge regions of said resilient and retaining rings located adjacent orifices of said resilient and retaining rings, to outer edge regions of said resilient and retaining rings.

15. An apparatus as set forth in claim 9, further comprising a sleeve connected with said extension for joint rotation therewith, said check valve having a control member fixedly connected with said sleeve.

16. An apparatus as set forth in claim 15, wherein said sleeve is made of a plastic material.

17. An apparatus as set forth in claim 16, wherein said sleeve has an annular shoulder, said control member including a retaining ring having an end surface abutting said annular shoulder.

* * * * *